Dec. 11, 1928.
L. G. FINNICUM
GLARE SHIELD
Filed Nov. 8, 1926    2 Sheets-Sheet 1
1,694,645
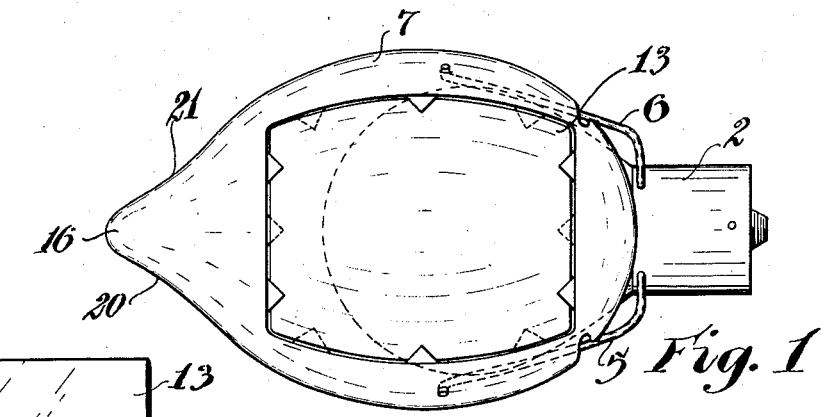
Fig. 1
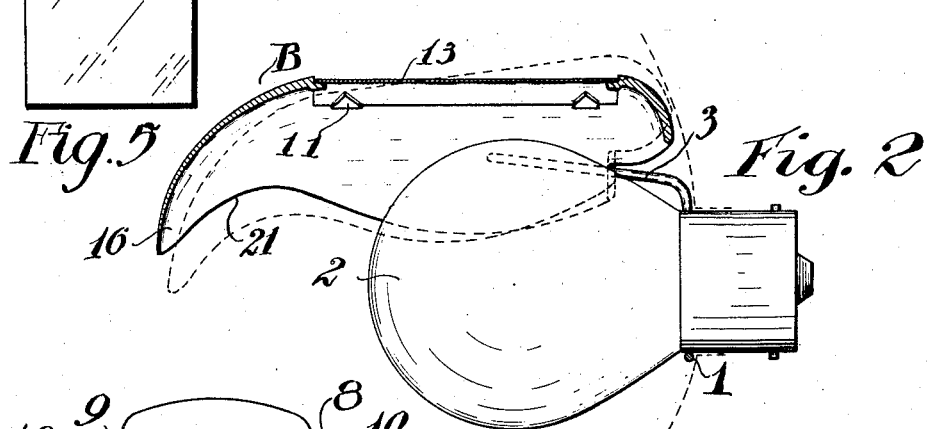
Fig. 5    Fig. 2
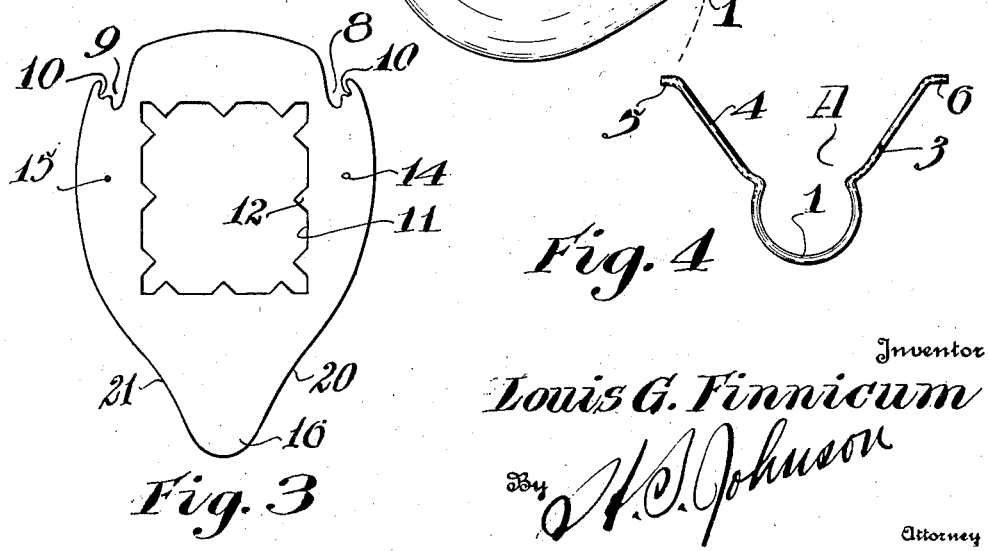
Fig. 4
Fig. 3
Inventor
Louis G. Finnicum
By H. S. Johnson
Attorney Dec. 11, 1928.

L. G. FINNICUM

GLARE SHIELD

Filed Nov. 8, 1926    2 Sheets-Sheet 2

1,694,645

Inventor

Louis G. Finnicum

By H. S. Johnson

Attorney

Patented Dec. 11, 1928.

1,694,645

UNITED STATES PATENT OFFICE.

LOUIS G. FINNICUM, OF ST. PAUL, MINNESOTA.

GLARE SHIELD.

Application filed November 8, 1926. Serial No. 147,142.

The present invention relates to a glare shield for automobile headlights.

With the large number of cars on the roads at present it is necessary, for safety and comfort in night driving, that glare should be eliminated from the headlights of all cars, and, this is required by law in a great many States.

An object of the present invention is to make a light, strong, glare shield for an automobile headlight.

In order to attain this object, there is provided as one feature of the invention, a spring clip looped to engage the base of a headlight lamp and having a pair of prongs extending laterally outward therefrom. A cupped shield has apertures on opposite sides thereof to receive the prongs of the spring clip and is also provided with notches in the sides thereof to engage the spring clip to adjustably hold the shield in position. An opening is provided in the top of the shield member and in this opening is permanently mounted a sheet of transparent or translucent material, such as celluloid which may be colored.

These and other features of the invention, not specifically mentioned, will be more fully brought out in the following description and the accompanying drawings, wherein:

Figure 1, is a view in top elevation of a headlight lamp with a glare shield made in accordance with the present invention mounted thereon.

Figure 2, is a view in side elevation thereof, the reflector of the headlight being indicated in dotted lines, the shield being shown in one position in solid lines and in adjusted position in dotted lines.

Figure 3, is a view in top elevation of a blank from which the headlight shield is formed.

Figure 4, is a view in side elevation of a spring wire clip used to support the glare shield.

Figure 5, is a view in top elevation of a transparent or translucent insert for the central portion of the shield.

Figure 6:
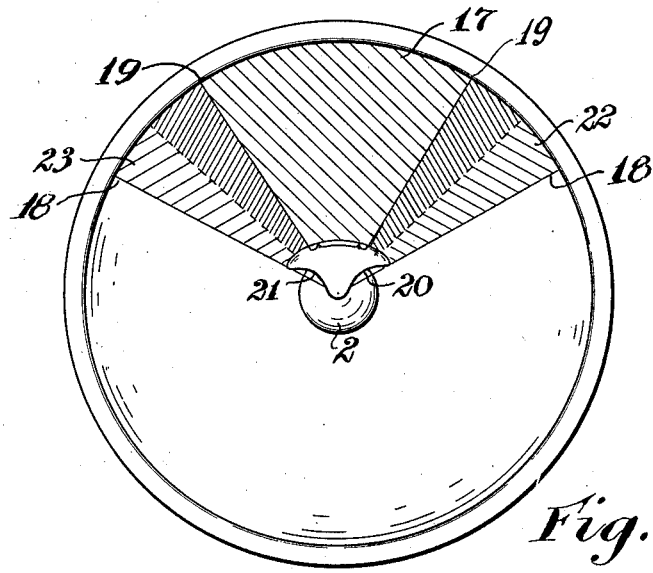
Figure 6, is a view in front elevation of the device mounted on a lamp set in a parabolic reflector.

Referring to the drawings in detail, a wire clip A is formed with an annular central portion 1 to encircle the base of an electric headlight lamp 2. A pair of arms 3 and 4 extend angularly forward and outwardly from the annular central portion of this clip and are provided with outwardly projecting end portions 5 and 6 at the extremities thereof.

A shield B comprises a cupped portion 7, having the forward end thereof curved downwardly in the form of a beak 16, while the rear end thereof is curved sharply downward and is provided with cut-out portions 8 and 9, each of said cut-out portions having notches 10 cut in the outer sides thereof. An opening 11 is cut centrally of the cup-shaped member B and is provided with prongs 12 extending inwardly from the sides of said opening to engage a transparent or translucent member 13 which may be of phenolic condensation product, the member 13 being inserted in the opening so that the edges thereof are gripped by the prongs 12 with alternate prongs on opposite sides of the celluloid. The celluloid may be colored green for both lamps, or may be colored green for the right hand lamp and red for the left hand lamp in accordance with marine practice. If desired, the shield B may also be made of opaque phenolic condensation product with a transparent insert therein in the same position as that illustrated.

In installing the device, the wire clip A is positioned to embrace the base of the lamp, as shown in Figures 1 and 2. The outwardly projecting end portions 5 and 6 of the spring clip member are then inserted in perforations 14 and 15, respectively, in the shield, the sides of the spring clip member A being compressed manually to permit the shield to be placed in position thereon, and then released so as to spring into the openings 14 and 15 in the shield. The side portions 3 and 4 of the spring clip member A are shaped to engage one or the other of the notches 10 in the outer sides of the shield.

After placing the shield in position in either of the notches, the headlights may be turned on and permitted to shine against a flat, vertical surface, such as the wall of a building or the door of a garage. If the brighter rays at the center of the beam do not rise above the level of the headlights the shield may be considered to be in the proper position. If, however, the rays rise materially above the level of the headlights when the wire clip is engaged in the upper notches, the shield may be tilted forward by pivoting it about the ends of the spring clip member to bring the lower notches in engagement with the sides of the spring clip member to tilt the shield forwardly to the dotted line position shown in Figure 2.

The sides of the shield are cut upwardly as at 20 and 21 in the rear of the beak 16 to give free passage to the rays directed angularly forward from the lamp since these rays are found not to cause glare and are valuable in giving breadth to the beam to light the sides of the road.

Figure 7:
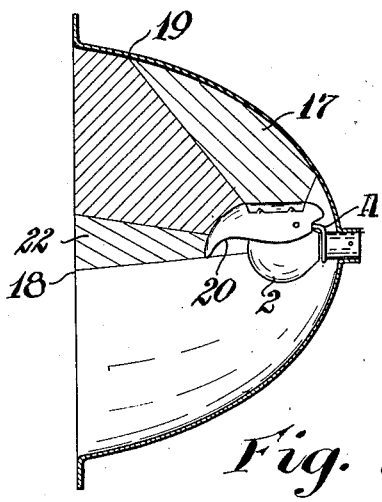
Figure 7, is a view in vertical, longitudinal section of the arrangement showing the glare shield in elevation.
Figure 8:
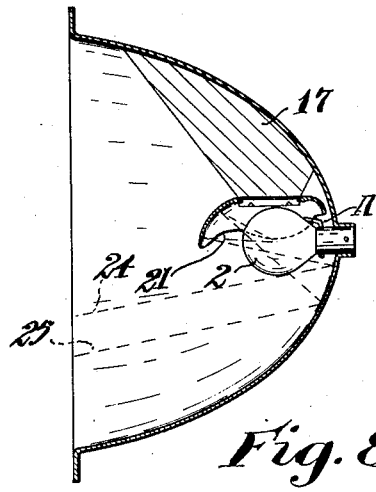
Figure 8, is a view similar to that shown in Figure 7 with the glare shield also shown in section.

Figures 6, 7, and 8 show the effect of the shield when mounted in a customary parabolic type reflector. The rays passing upwardly through the transparency 13 are softened and are reflected forwardly throughout the area 17 as a softened glow of the color of the transparency. From directly in front of the headlight the entire area from 18 to 19 is shielded by the opaque shield the beak 16 extending down to intercept the forwardly directed rays. Cut-out side portions 20 and 21 permit the laterally directed rays to escape throughout the areas 22 and 23 while from the interior of the shield the rays are reflected back to the lower portion of the parabolic reflector as at 24 and 25 in Figure 8.

There is thus effected a complete shielding of the headlight against the rays which cause glare, without affecting the rays which light the road and without reducing the lateral angle of the beam.

I claim:

1. A glare shield for automobile headlight lamps, comprising a wire support member having an annular portion closely embracing the base of a headlight lamp with a pair of arms extending angularly outward therefrom, a concave shield member pivotally supported on said arms, and having a plurality of notches engageable with said arms to adjustably hold said shield member in position on said arms.

2. A glare shield for automobile headlight lamps, comprising a wire support member having an annular portion closely embracing the base of a headlight lamp, and having a pair of arms extending angularly outward therefrom, a concave shield member supported on said arms to pivot in a vertical plane longitudinally of said headlight lamp, the forward portion of said shield being extended downwardly in the form of a beak to intercept the immediately forwardly directed rays of light from said headlight lamp, and having the sides thereof immediately rearwardly of said beak curved upwardly to permit the passage of laterally directed rays of light from said headlight lamp.

3. A glare shield for automobile headlight lamps, comprising a wire support member having an annular portion closely embracing the base of a headlight lamp with a pair of arms extending angularly outward therefrom, a concave shield member pivotally supported on said arms to pivot in a vertical longitudinally disposed plane, and having a plurality of notches to engage the angularly disposed arms of the supporting member to adjustably retain said shield in position.

4. A glare shield for automobile headlight lamps, comprising a wire support member having an annular portion embracing the base of a headlight lamp, a pair of arms extending angularly outward therefrom and having the ends of said arms bent outward to form a pivotal support for said shield, a concave shield pivotally mounted on the outwardly bent ends of said arms, notches in said shield to engage said arms to hold said shield in an adjusted position, the forward portion of said shield being curved downwardly in the form of a beak to intercept the immediately forwardly directed rays of light from said headlight lamp, and having the sides thereof rearwardly of said beak curved upwardly to permit the passage of laterally directed light rays from said lamp, and a transparent insert set in the top of said shield to permit the passage of modified rays of light therethrough.

5. A glare shield for automobile headlight lamps, comprising a wire support member having a pair of outwardly turned end portions, a concave shield pivotally mounted on said end portions, notches in said shield adjacent the point of attachment to said end portions to engage said wire members to hold the shield in adjusted position.

In testimony whereof I affix my signature.

LOUIS G. FINNICUM.